United States Patent [19]

Wunderlich et al.

[11] Patent Number: 5,802,324
[45] Date of Patent: Sep. 1, 1998

[54] COMPUTER SYSTEM WITH PCI REPEATER BETWEEN PRIMARY BUS AND SECOND BUS

[75] Inventors: Russell J. Wunderlich; Khaldoun Alzien, both of Houston, Tex.

[73] Assignee: Compaq Computer Corporation, Houston, Tex.

[21] Appl. No.: 773,037

[22] Filed: Dec. 23, 1996

[51] Int. Cl.[6] ............................................. G06F 13/00
[52] U.S. Cl. ............................ 395/281; 395/308; 395/309
[58] Field of Search ................................. 395/306, 308, 395/309, 200.62, 281, 287

[56] References Cited

U.S. PATENT DOCUMENTS

| | | | |
|---|---|---|---|
| 5,596,729 | 1/1997 | Lester et al. | 395/308 |
| 5,621,900 | 4/1997 | Lane et al. | 395/300 |
| 5,664,124 | 9/1997 | Katz et al. | 395/309 |
| 5,673,399 | 9/1997 | Guthrie et al. | 395/308 |
| 5,673,400 | 9/1997 | Kenny | 395/309 |

OTHER PUBLICATIONS

Pico/Power®, A Cirrus Logic Division; PT80C524 Preliminary Data Book; Version 0.7, Aug. 1995.

*Primary Examiner*—Gopal C. Ray
*Attorney, Agent, or Firm*—Pravel, Hewitt & Kimball

[57] ABSTRACT

A PCI repeater coupled between a primary bus and a secondary bus transparently decodes upstream transactions by halting operations on the secondary bus while the transaction is decoded on the primary bus. A clock disable signal is internally generated to temporarily disable the bus clock on the secondary bus. Transactions initiated on the secondary bus are first sent upstream regardless of whether or not the target is upstream. If the transaction is not positively claimed by a target on the upstream bus, the PCI repeater subtractively claims the transaction. Special upstream decoding logic in the PCI repeater is avoided by sending the transaction upstream and using the inherent decoding logic of PCI devices.

24 Claims, 15 Drawing Sheets

COMPUTER SYSTEM WITH PCI REPEATER BETWEEN PRIMARY BUS AND SECOND BUS

BACKGROUND OF THE INVENTION

1. Field of the Invention

The invention relates to an apparatus and method of bridging two PCI buses together, and more particularly to a PCI-to-PCI repeater.

2. Description of the Related Art

The performance of a personal computer (PC) is dependent upon many factors, such as the speed of the processor, memory and input/output (I/O) subsystem. With the introduction of the peripheral component interconnect (PCI) bus in 1992, the I/O subsystem was given a high performance bus from which to operate.

Originally, the PCI bus was not intended to supplant the existing expansion buses, such as the industry standard architecture (ISA) bus or extended industry standard architecture (EISA). However, pressure from the computer industry and competing buses caused the PCI bus to be available for expansion bus purposes. Thus, computer systems may incorporate PCI devices onto the motherboard or provide support for add-in boards.

The PCI bus is referred to as a mezzanine bus, or a local bus, because it usually resides between the very high performance processor bus and the lower performance ISA or EISA bus. The logic that connects one computer bus to another, allowing an agent on one bus to access an agent on the other, is known as a bridge. In PCI vernacular, an agent is any entity or device that operates on a computer bus. An agent can be either a bus master or bus slave. Bus masters, or initiators, initiate bus transactions and bus slaves, or targets, respond to a bus transaction initiated by a bus master. Oftentimes, an initiator is on one bus and the target is on another.

The bridge provides a low latency path through which the processor may directly access PCI devices mapped anywhere in the memory or I/O address space of the computer system. The primary function of a bridge is to map the address space of one bus into the address space of another bus. The PCI bus defines three physical address spaces: memory, I/O space, and configuration space. Address decoding on the PCI bus is distributed; i.e. each device coupled to the PCI bus performs address decoding. The PCI specification defines two styles of address decoding: positive and subtractive. Positive decoding is faster since each PCI device is looking for accesses in the address range(s) the device has been assigned. Subtractive decoding can be implemented by only one device on the PCI bus since the subtractive decoding device accepts all accesses not positively decoded by some other agent.

Every PCI transfer begins with an address phase, during which an address/data bus (AD[31:0]) transfers the address and a command/byte enable (C/BE_[3:0]) bus transfers a command code. One or more data phases follow this phase, during which the same address/data bus transfers data and the command/byte enable bus transfers byte-enable signals. In a burst cycle, multiple data phases can follow a single address phase. In PCI terminology, the requesting PCI device is known as the initiator, and the addressed PCI device as the target. Every transfer starts with the activation of the frame (FRAME_signal.

A device select (DEVSEL#) signal is driven by the target to indicate that it is responding to the transaction. A device decodes the address/data lines and asserts a device select (DEVSEL#) signal if it owns the starting address. DEVSEL# may be driven with slow, medium or fast timing. If no agent asserts DEVSEL# within the slow timing parameters, the agent performing subtractive decoding may claim and assert DEVSEL#. The "#" or "_" refers to active low signals. More details on the PCI bus and particularly PCI addressing are found in the PCI Local Bus Specification, Production Version, Revision 2.1, dated Jun. 1, 1995, which is published by the PCI Special Interest Group of Hillsboro, Oregon and hereby incorporated by reference.

The target indicates its readiness with an active target ready (TRDY_signal. An active TRDY_during a write access indicates that the target can take the data from the address/data bus. An active TRDY_during a read access indicates that the requested data is available on the address/data bus.

In addition, the initiator must also indicate its readiness to the PCI bridge, through an active initiator ready (IRDY_ signal. An active IRDY_during a write access indicates that the initiator has sent the write data on the address/data bus. In a read access, an active IRDY_indicates that it accepts the data from the address/data bus. The initiator ends or interrupts the transfer by deactivating the FRAME_signal. The target can also stop the transfer by activation of a stop (STOP_) signal.

As defined, the PCI bus is limited to ten loads. A PCI device incorporated onto the motherboard is essentially one load and a PCI slot is considered two loads. Hence, a computer system with a processor/PCI bridge, three PCI slots and a PCI/ISA bridge is limited to two motherboard devices. Since oftentimes two motherboard devices are too limiting, it is desirable to exceed the ten load limit.

One method of extending the number of loads described in the above-referenced PCI Specification is to use multiple PCI buses. Multiple PCI buses provide support for more devices than can be directly connected to one PCI bus. There are two ways to organize multiple PCI buses: as peers of each other or hierarchically. Peer buses require multiple bridges on the processor bus that may affect loading. A hierarchical configuration has advantages if I/O patterns tend to be from one PCI device to another. If most I/O traffic goes into and out of memory, then peer buses make more sense. However, either bus configuration requires that the bridges be configured at startup to respond to an access on their primary bus only if the address falls into a specified range. Furthermore, bridges separate the bus into two logical buses, thereby further complicating the configuration.

Each bridge includes address registers that are programmable through configuration space, so that the bridge responds to an access on its primary bus only if the address falls into the range specified by those registers; otherwise the access is claimed by a subtractive decode agent. Only one set of address range response registers is required by the PCI Specification, however if multiple buses are provided the complexity of the address may increase and multiple sets of registers are needed. Generally, the address range response registers are programmed to correspond to the addresses unused by the primary bus, instead of the memory space required by the secondary bus. Thus, the secondary side of the bridge responds to all memory accesses except those that fall into the ranges specified by the address response range registers. All transactions initiated on the secondary bus, outside of the programmed range, are responded to on the primary bus. It is the responsibility of system software to maintain the address response range registers of the bridges so that address decoding is properly performed.

The configuration of the address range register grows even more complicated if devices are allowed to be hot-pluggable. Hot pluggable devices, such as PC Cardbus cards, cause problems since the address range changes with the insertion or removal of the hot pluggable device. Therefore, it is desirable to remove this level of complexity and simultaneously provide a high number of PCI loads for sufficient functionality and expandability.

Transparent bridges have attempted to solve the configuration problem by making the bridge appear invisible to software. However, the performance of such bridges are often less than desirable. Cycles that were performed on the primary bus at top PCI bus speed take three times as long to complete on the secondary bus, if proper PCI timing conventions are followed. Therefore, a higher performing transparent bridge is desirable.

SUMMARY OF THE INVENTION

A computer system of the present invention includes a PCI bridge or repeater to increase the number of capacitive loads on a PCI bus without requiring significant changes to software. The PCI repeater connects a primary portion of the PCI bus to a secondary portion of the PCI bus. The portions act as one logical bus but are electrically separate for loading purposes. An arbiter controls access to the buses.

Transactions initiated on the primary bus and intended for a target on the secondary bus are downstream transactions. Transactions initiated on the secondary bus and intended for a target on the primary bus are upstream transactions. Transactions initiated on the primary bus are echoed, passed or reflected to the secondary bus, and vice versa.

Signals are clocked through the PCI repeater; hence, a one clock delay is built in. Because of the inherent delay, one of the buses will complete the transaction before the other. To prevent the earlier finishing bus from starting another transaction while the later finishing bus is completing the transaction, the arbiter removes any pending grants and will not grant the bus to any device on either bus until the later finishing bus has completed the transaction. This technique works especially well for bursted transactions where the target is unable to move data at the same speed as an initiator.

Upstream transactions are handled like downstream transactions, except if there is a subtractive decode agent on the secondary such as an ISA bus bridge. Since only one subtractive decode agent can reside on a bus, the transaction is not subtractively decodable both upstream to the primary bus and downstream to the ISA bus. In a first alternative, subtractive decoding to the ISA bus by a PCI to ISA bridge is disabled if the transaction is initiated on the secondary bus. This provides peer to peer transactions only between devices on the primary and secondary buses. In a second method, ISA subtractive decoding is enabled. After the transaction starts on the secondary bus, the secondary bus clock is halted to allow a target on the primary bus to claim the transaction. If the transaction is not claimed the transaction finishes running on the secondary bus for either a secondary bus target to positively claim or the PCI to ISA bus bridge to subtractively claim. Thus, upstream address decoding is not needed on the PCI repeater.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
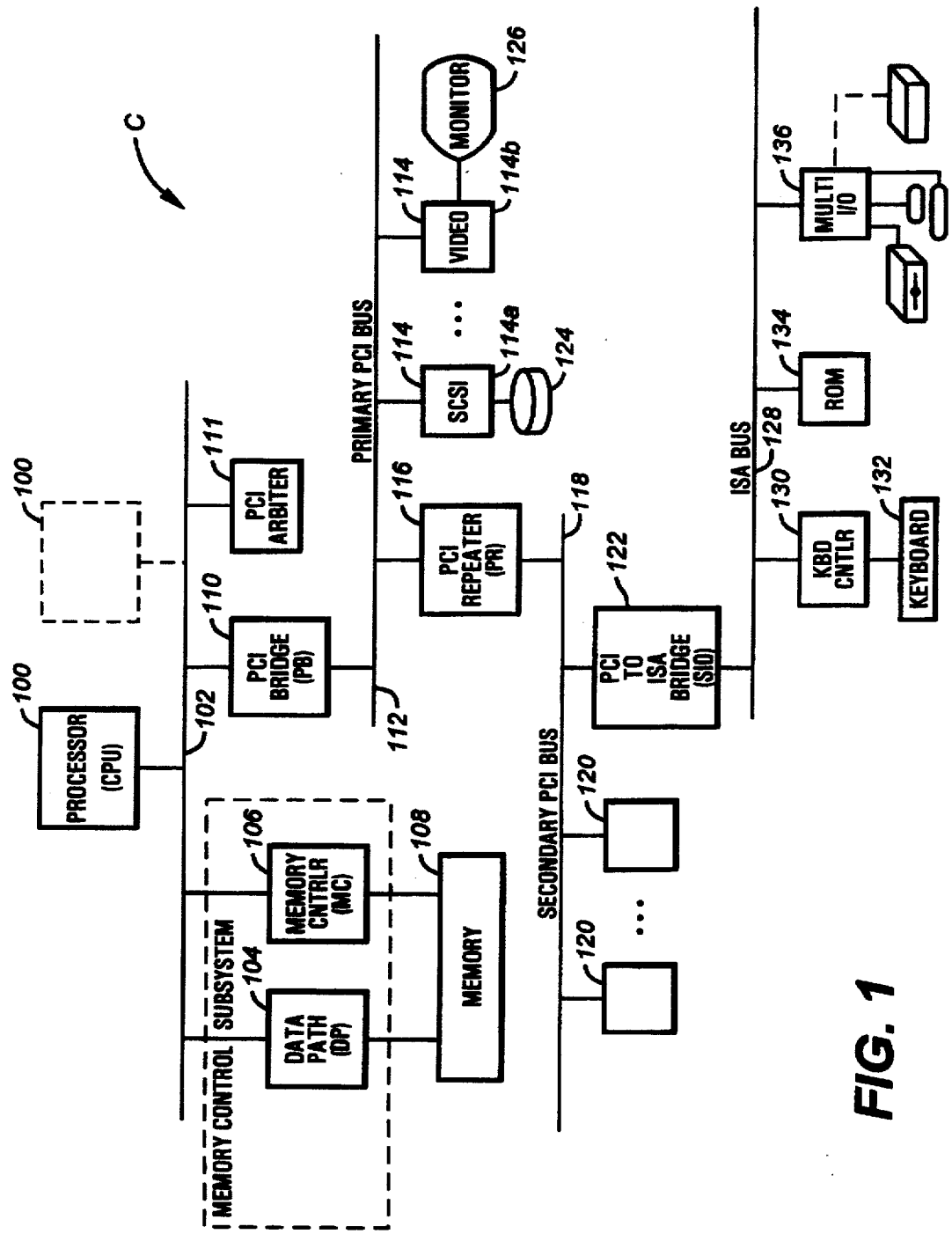
FIG. 1 is a block diagram illustrating a computer system according to the preferred embodiment.

Turning now to the drawings, a computer system C according to the preferred embodiment of the present invention is shown. To provide sufficient process and capability, the computer C deploys one or more processors 100 such as the Pentium Pro™ Processor available from Intel Corporation located in Santa Clara, Calif. The Pentium Pro™ Processor 100 includes a primary and secondary cache. Of course, other types of processors can be used with minimal changes. The Processor 100 is connected to a Pentium Pro™ host bus called the Processor Bus 102 which is a high performance bus utilizing gunning transceiver logic (GTL) as generally defined by the Pentium Pro™ specification.

In addition to the Processor 100, the processor bus 102 is connected to a data path unit (DP) 104, such as an Intel 82452GX, and a memory controller (MC) 106, such as an Intel 82453GX, which collectively form a memory control subsystem for a memory unit 108, which further connect to several memory interface components, such as an Intel 82451KX (not shown). The data path unit 104, the memory controller 106 and the memory interface components collectively form a memory control subsystem for the memory unit 108. The memory unit 108 includes several slots for receiving memory modules, such as a 72 pin extended data output (EDO) dynamic random access memory (DRAM) module. The memory controller 106 provides address, control and timing to the memory unit 108, while the data path unit 104 interfaces a 72-bit data portion of the processor bus 102 to the memory unit 108. The memory controller 106 and the data path unit 104 are capable of receiving a memory request from the processor 100, queuing it and responding after the requested operation has completed. Additionally, the memory controller 106 provides memory error correction, including the capability of single bit and multi bit error detection on the fly. The memory controller 106 can handle up to four gigabytes of DRAM. Memory arrangements having non-interleaved, ×2 and ×4 interleaving configurations are supported by the memory control subsystem.

In addition to the memory control subsystem, the processor bus 102 connects to one or more peripheral component interconnect (PCI) bridges 110, such as an Intel 82454GX. The PCI bridge 110 provides the necessary logic and control for passing bus cycles between the processor bus 102 and a primary PCI bus 112. It is noted here that although a hierarchical configuration is shown, the present invention works equally as well in peer-to-peer configurations.

Attached to the primary PCI bus 112 are one or more PCI devices 114, such as a small computer system interface (SCSI) controller 114a and a video system 114b. The SCSI controller 114a is connected to a hard disk drive 124 and the video system 114b, including video memory, is connected to a monitor 126. In addition to the PCI devices 114, a PCI repeater or bridge 116 according to the present invention is connected between the primary PCI bus 112 and a secondary PCI bus 118. The PCI repeater 116 electrically isolates the secondary PCI bus 118 from the primary PCI bus 112 but causes both buses to appear as one logical PCI bus. The PCI repeater 116 performs this transparently to system software thereby increasing the number of PCI loads without adding significant complexity to the system software.

Attached to the secondary PCI bus 118 are one or more PCI devices or slots 120 and a PCI to ISA bridge 122. The PCI to ISA bridge 122 passes cycles between the secondary PCI bus 118 and an industry standard architecture (ISA) bus 128. Attached to the ISA bus 128 are a keyboard controller 130, a ROM 134 and a multi I/O unit 136 supporting two serial ports, a parallel port, a floppy disk controller connected to a floppy drive and an integrated drive electronics (IDE) interface for connecting to an optional IDE hard disk drive or CD ROM drive.

Figure 2:
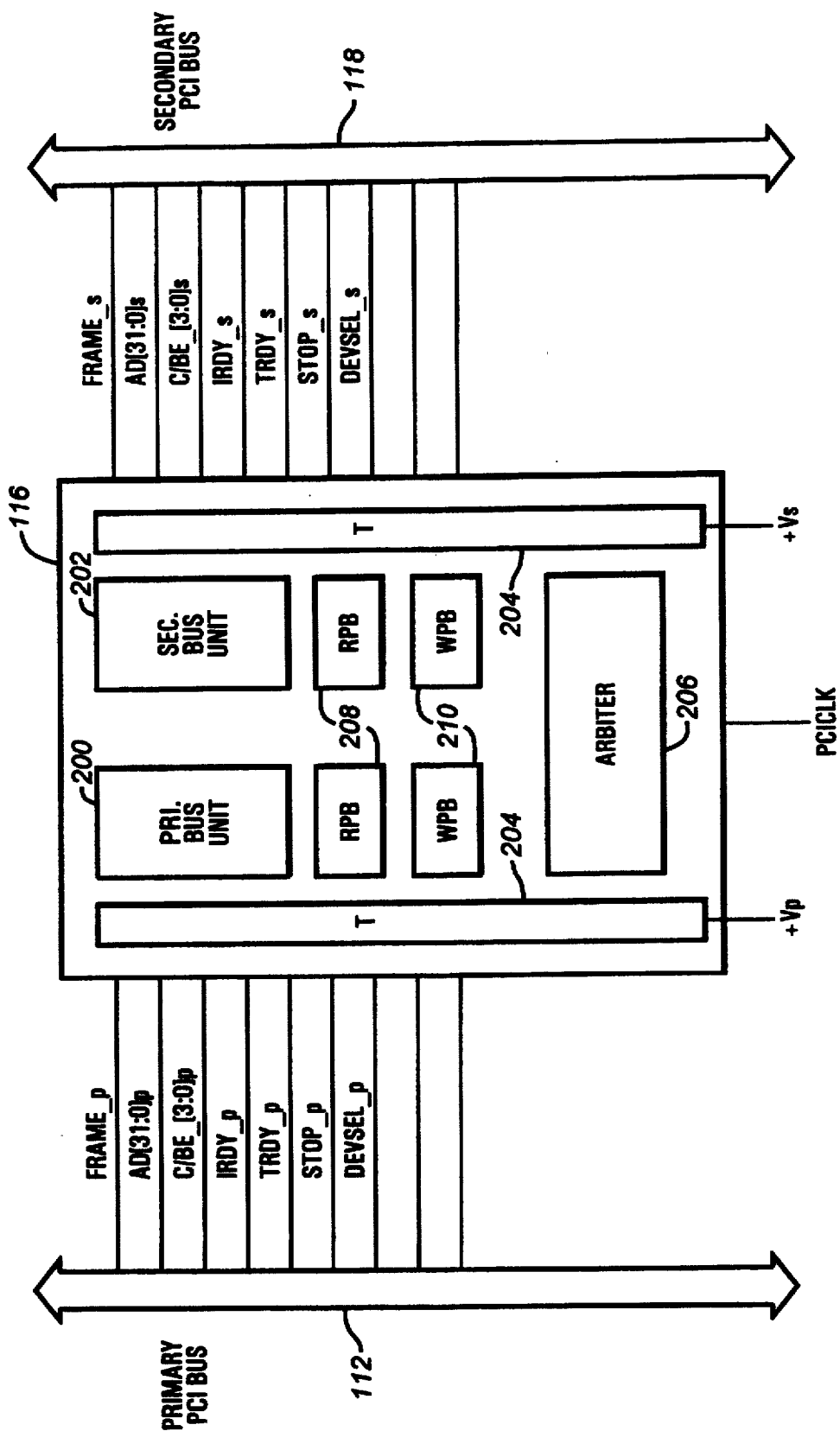
FIG. 2 is a block diagram illustrating a PCI repeater according to the preferred embodiment.

Now turning to FIG. 2, there is illustrated a block diagram of the PCI repeater 116. The repeater 116 is comprised of a primary bus unit 200 connected to the primary bus 112 and a secondary bus unit 202 connected to the secondary bus 118. Each bus unit has selectable voltage translators 204 for converting signal voltage levels to a common voltage, such as 3.3 V. For example, if the primary PCI bus 112 and the PCI repeater 116 operated at 3.3 V and the secondary PCI bus operated at 5 V, the voltage translators 204 of the secondary side would convert output signals to 5 V and input signals from 5 V to 3.3 V. To facilitate the voltage translation, the primary side is connected to a+Vp voltage and the secondary side is connected to a +Vs voltage to select the voltage. This is useful for applications such as a portable computer and docking station where the portable computer may operate at a 3.3 V level to conserve power, but the docking station operates at the conventional 5 V level. The repeater 116 can be placed in either the portable computer or the docking station to provide a connectable PCI bus to the docking station.

Also included in the repeater 116 are read prefetch buffers (RPB) 208 and write posting buffers (WPB) 210 for each side, and an arbiter 206 for arbitrating access between the primary PCI bus 112 and secondary PCI bus 118. The read prefetch buffers 208 are preferably two DWORDs deep, but could be any depth. An alternative embodiment can have an external arbiter. A single clock input is used to provide timing for both the primary and secondary bus units 200 and 202. Therefore, the primary and secondary PCI buses are required to operate at the same frequency. An alternative embodiment includes a second clock input and synchronization logic for operating the buses at different frequencies, although the PCI repeater 116 will only operate as fast as the slowest bus. The PCI repeater 116 also supports a zero power consumption state.

The primary bus unit 200 contains conventional configurable address decode logic for positively and subtractively claiming transactions from the primary PCI bus 112. The secondary bus unit 202 lacks any address decoding for reasons disclosed below.

The PCI repeater 116 is different than a conventional bridge because it prefers not to store and forward data. Generally, incoming signals are clocked on a rising edge of the PCI bus clock and passed through to the other bus. However, it is a function of the repeater to control the echoing or repeating of signals from one bus to another without violating any of the PCI operating rules. The functionality of the PCI repeater will be discussed with respect to downstream cycles and upstream cycles. Single and burst data cycles are subsets of each.

Downstream Transactions

Downstream transactions or cycles refer to transactions initiating on the primary PCI bus 112 and targeting a device on the secondary PCI bus 118, or buses below. The PCI repeater 116 is the only subtractive decode device on the primary PCI bus 112, in compliance with PCI conventions. Subtractively decoding the downstream transactions, rather than positively decoding, further eliminates BIOS (basic input output system) and operating system overhead. The PCI repeater 116 generally echoes on the secondary PCI bus 118 the entire transaction as it happens on the primary PCI bus 112 regardless of whether the transaction is intended for the secondary bus 118. The PCI repeater 116 reflects the primary PCI bus 112 delayed by one clock, therefore, the PCI repeater 116 adds two clocks to all downstream transactions—one for cycle start and one for data return. Hence, a transaction positively claimed with medium decode timing on the secondary bus, will appear to devices on the primary bus as a subtractively decoded transaction.

In a downstream transaction, signals echoed from the initiator on the primary PCI bus 112 to the target on the secondary PCI bus 118 are FRAME_p, AD[31:0]p, C/BE [3:0]p and IRDY_p. Signals echoed from the secondary PCI bus 118 to the initiator on the primary PCI bus 112 are TRDY_s, STOP_s and DEVSEL_s. In an upstream transaction, signals echoed from the initiator on the secondary PCI bus 118 to the target on the primary PCI bus 112 are FRAME_s, AD[31:0]s, C/BE[3:0]s and IRDY_s. Signals echoed from the primary PCI bus 112 to the initiator on the secondary PCI bus 118 are TRDY_p, STOP_p and DEVSEL_p.

Figure 3:
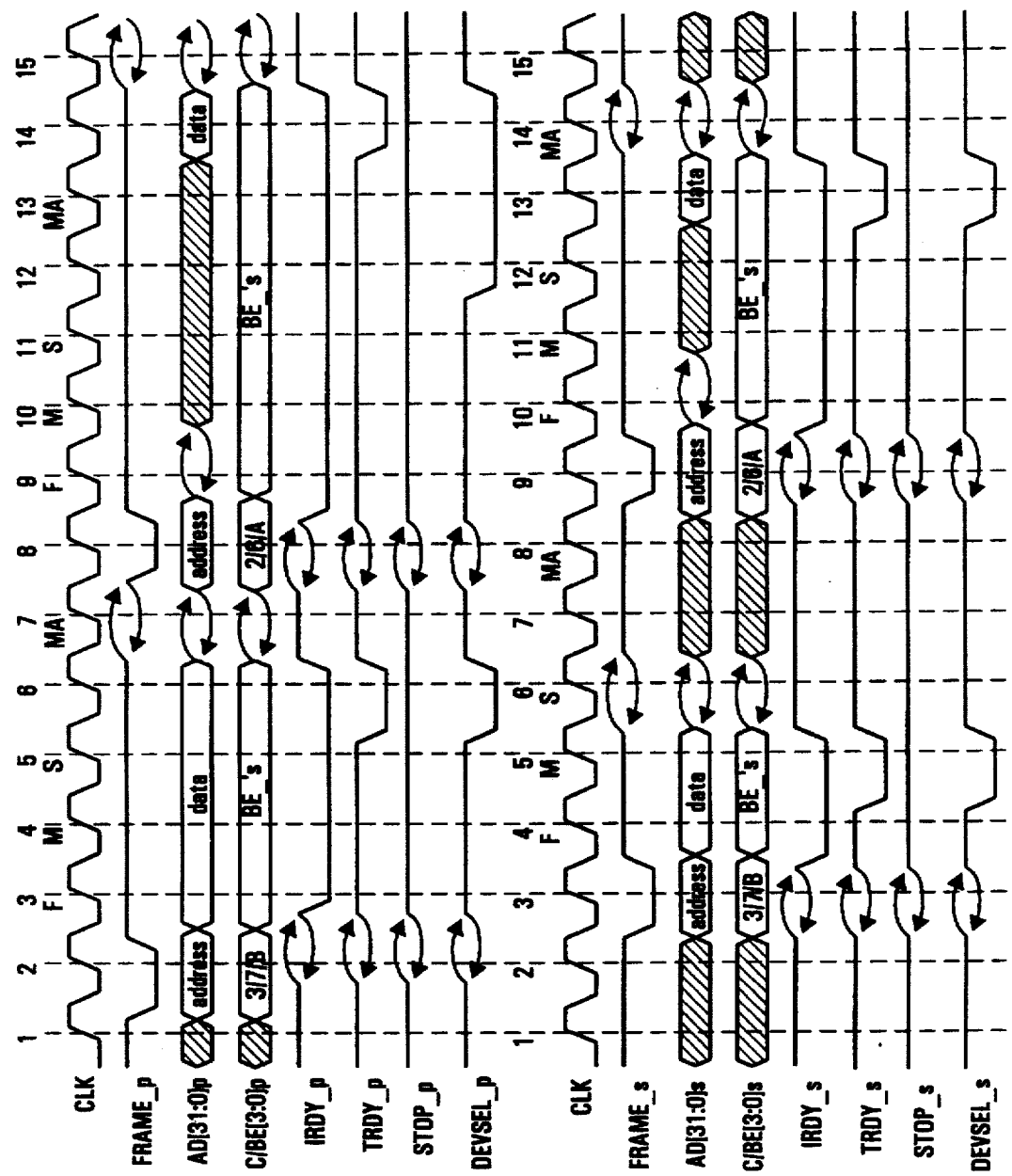
FIG. 3 is a timing diagram illustrating a downstream single data phased write transaction followed by a downstream single data phase read transaction.

Now referring to FIG. 3, there is illustrated a timing diagram of two single DWORD transactions initiated on the primary PCI bus 112 and targeted to the secondary PCI bus 118. The first transaction is a write transaction positively claimed by a device on the secondary bus 118 using medium timing and the second transaction is a read transaction subtractively decoded on the primary bus 112 and secondary bus 118. In the following Figures, signal names ending with a small "p" are primary PCI bus 112 signals and signal names ending with a small "s" are secondary PCI bus 118 signals, as shown in FIG. 2. The underscore after the signal name indicates the signal is active low. The broken circles indicate a turn-around cycle as defined in the PCI specification.

In response to a transaction initiated on the primary PCI bus 112, the PCI repeater 116 asserts FRAME_s, AD[31:0] s, and C/BE_[3:0]s one clock delayed (clocks 2 and 8) on the secondary PCI bus 118. IRDY_is also echoed onto the secondary PCI bus 118 on clocks 3 and 9. Although not shown, other master signals, such as a LOCK_and IDSEL signals are also echoed as needed on the secondary PCI bus 118.

The PCI repeater 116 senses DEVSEL_p deasserted on clocks 5 and 11, and therefore, accepts the cycle using subtractive decode timing on behalf of the secondary PCI bus 118. For write transactions, once DEVSEL_s is sampled low (clock 5), the PCI repeater 116 copies the states of the slave signals (DEVSEL_s, TRDY_s and STOP_s) from the secondary PCI bus 118 to the primary PCI bus 112 (clock 6). After the PCI repeater 116 senses DEVSEL_s and TRDY_s asserted low (clock 5), IRDY_s is deasserted to complete the transaction on the secondary PCI bus 118. The transaction completes on the primary PCI bus 112 one clock later (clock 6). Echoing DEVSEL_s and TRDY_s to the primary PCI bus 112 ensures that the issuing master has the final responsibility for executing the cycle.

For read cycles, once the PCI repeater 116 senses DEVSEL_s asserted (clock 13), the PCI repeater 116 copies the states of the slave signals (DEVSEL_s, TRDY_s, STOP_s and AD[31:0]s) from the secondary PCI bus 118 to the primary PCI bus 112. The PCI repeater 116 preferably does not post any data transfer that consists of a single data phase. This simplifies the design of the PCI repeater 116 and allows the repeater 116 to back out from any transfer which is retried by a target. The resulting latency across the PCI repeater 116 is 2 clocks in addition to the target latency.

Figure 4:
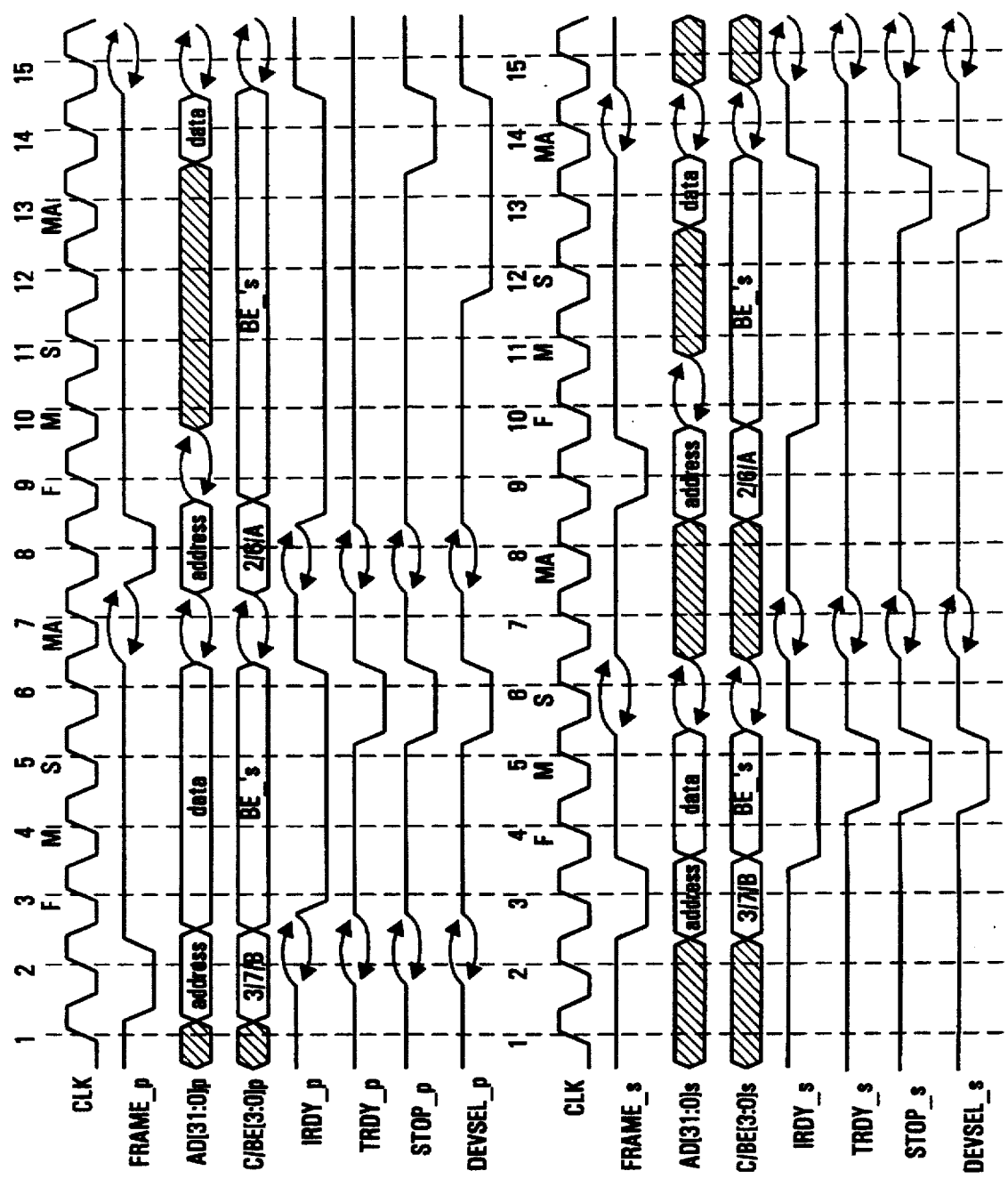
FIG. 4 is a timing diagram illustrating a target disconnect write transaction followed by a target retry read transaction.

Now referring to FIG. 4 there is illustrated a target disconnect write transaction followed by a target retry read transaction. In response to a write transaction initiated on the primary bus 112, the PCI repeater 116 asserts FRAME_s, AD[31:0]s, and C/BE_[3:0]s one clock later (clocks 2 and 8) on the secondary PCI bus 118. The assertion IRDY_p is also echoed on the secondary PCI bus 118 on clocks 3 and 9.

The PCI repeater 116 senses that DEVSEL_p remains deasserted on clocks 5 and 11, and therefore, accepts the transaction using subtractive decode timing on behalf of the secondary PCI bus 118. For write cycles, once DEVSEL_s is sampled asserted (clock 5), the PCI repeater 116 copies the states of the slave signals (DEVSEL_s, TRDY_s and STOP_s) from the secondary PCI bus 118 to the primary PCI bus 112 (clock 6). A write transaction disconnected on the secondary bus 118 is also disconnected on the primary PCI bus 112 because the STOP_p signal is driven on the primary side concurrently with TRDY_p. Waiting on DEVSEL_s and TRDY_s before accepting the data on the primary PCI bus 112 ensures that the initiating master has the final responsibility for executing the transaction.

For read transactions, once the repeater 116 senses DEVSEL_s asserted (clock 13), the repeater 116 copies the states of the slave signals (AD[31:0], DEVSEL_s, TRDY_s and STOP_s) from the secondary PCI bus 118 to the primary PCI bus 112 (clock 14). A retried transaction on the secondary bus 118 is also retried on the primary bus 112 because the STOP_p signal is driven on the primary side concurrently with TRDY_p negated.

Figure 5:
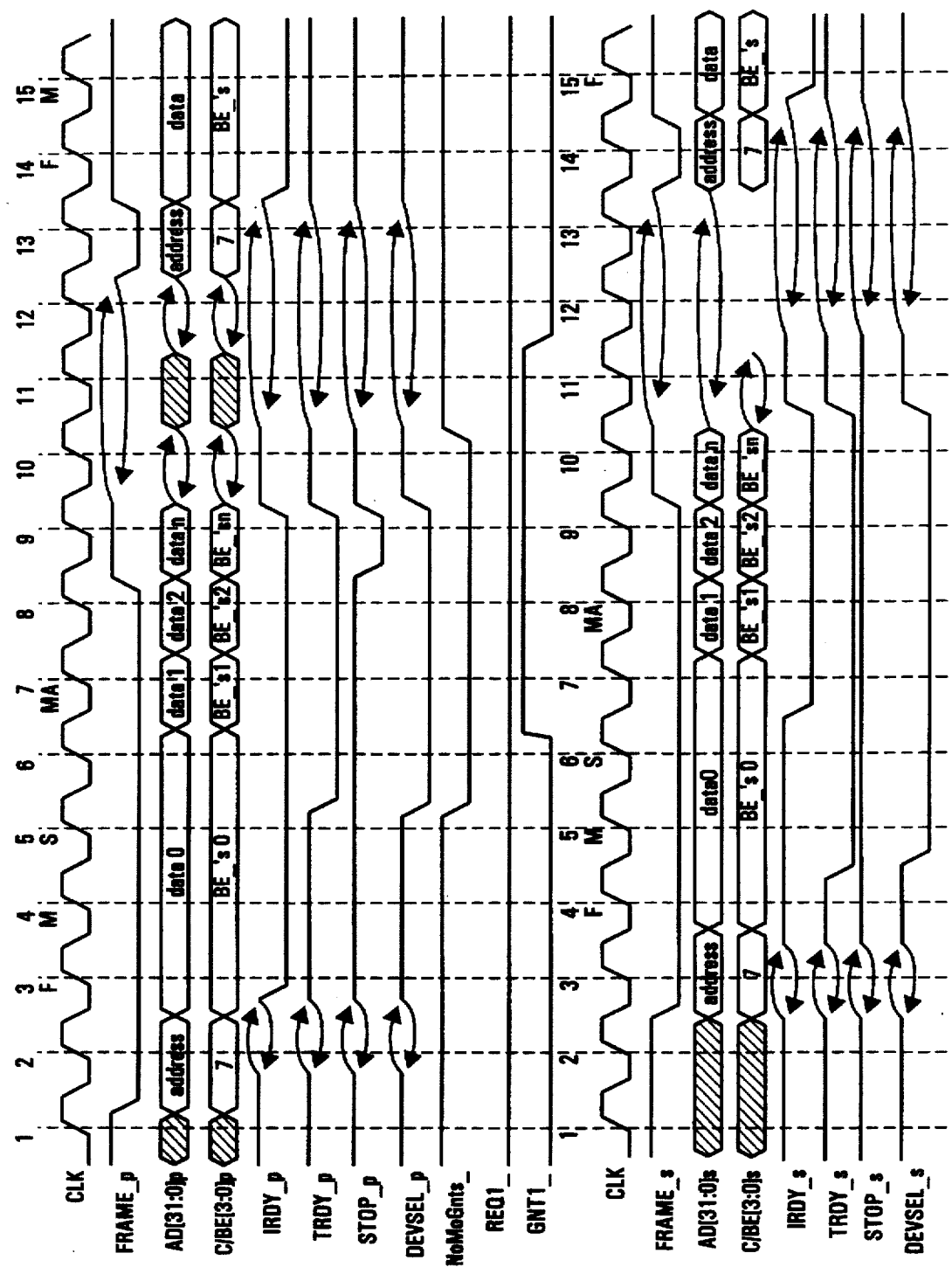
FIG. 5 is a timing diagram illustrating a downstream burst write sequence.

Now referring to FIG. 5, there is illustrated a downstream burst write transaction. Write bursting across the PCI repeater 116 is achieved by accepting the burst data with zero wait states, once the transfer is accepted by the target. The PCI repeater 116 senses a burst sequence at clock 3 because both IRDY_p and FRAME_p are asserted. Since the transaction is a burst write transaction, the repeater does not assert IRDY_s at clock 3, as would happen for a single DWORD transaction. Instead, the PCI repeater 116 delays the assertion of IRDY_s on the secondary bus 118 until clock 6, the clock following the repeater's 116 accepting the first data transaction using subtractive decode timing on the primary bus 112 at clock 5. The delay is needed to insure that the PCI repeater has the next transaction's byte enables (which are available at clock 8, the first clock following TRDY_p asserted) in time to meet the PCI Specification timing.

In response to the transaction initiated on the primary PCI bus 112, the PCI repeater 116 asserts FRAME_s, AD[31:0]s and C/BE[3:0]s one clock delayed (clock 2) on the secondary bus 118. A request/grant signal pair (REQ1_/GNT1_ corresponds to a master on the primary side requesting/gaining access to the bus 112. The PCI repeater 116 senses DEVSEL_p deasserted on clock 5, and so subtractively decodes the transaction on behalf of the secondary bus 118 by asserting DEVSEL_p on the primary bus in clock 5. On the secondary bus 118, a target 120 decodes the address and command, using medium decode timing and asserts DEVSEL_s and TRDY_s in clock 4. In turn, the PCI repeater 116 senses the assertion of DEVSEL_s and TRDY_s and echoes TRDY_p onto the primary bus one clock later (clock 5) to begin the subsequent data transactions. Although medium decode timing is illustrated on the secondary bus, any timing is supported with the effect being a longer first data transaction. The PCI repeater 116 accepts the data with zero wait states. If the target 120 is unable to accept the data with zero wait states, the PCI repeater buffers the data in the write posting buffer 210. The secondary side delivers the data at a rate limited to the speed of the target.

Due to possible differences in speed between the initiator and the target, the PCI repeater could end up with unfinished cycles in its write posting buffer 210. If a bus master begins another transaction before the PCI repeater 116 empties its write posting buffer 210, a deadlock condition could develop because the PCI repeater 116 would not relinquish the secondary PCI bus 118 until it empties its write posting buffer 210. Therefore, according to the preferred embodiment, to prevent any initiator from obtaining the primary bus 112 while the PCI repeater 116 is busy, the PCI repeater 116 notifies the PCI arbiter 111 of the need to stop granting the primary PCI bus 112 while it is finishing the burst sequence on the secondary PCI bus 118. At the same time no other initiator can access the secondary bus 118 because the repeater will not relinquish the secondary PCI bus 118 until it empties its write posting buffer 210. A sideband signal no more grants (NoMoGnts_) forces the arbiter 111 to stop granting requests. While the NoMoGnts_ signal is asserted, the arbiter 111 deasserts any pending grant signals, for example (GNT1). When the burst sequence is completed on the secondary PCI bus 118 (clock 10), the PCI repeater 116 deasserts the NoMoGnts_signal. After the NoMoGnts_signal is deasserted, the PCI arbiter 111 is free to issue grant signals again.

On clock 6, the first data is accepted by the repeater 116, on the primary side, which causes the data and byte enables for the next transaction to become available. The PCI repeater 116 then asserts IRDY_s to allow the write data transfer to occur. The write transfers then continue until the initiator is done, or disconnected by the PCI repeater 116 asserting STOP_p as shown in FIG. 5, clock 9. The STOP_p signal is asserted if the write posting buffers are approaching their limit, as in this example. Although the PCI repeater 116 adds additional latency to the transaction, the effective burst rate approaches the limit of the PCI bus.

Figure 6:
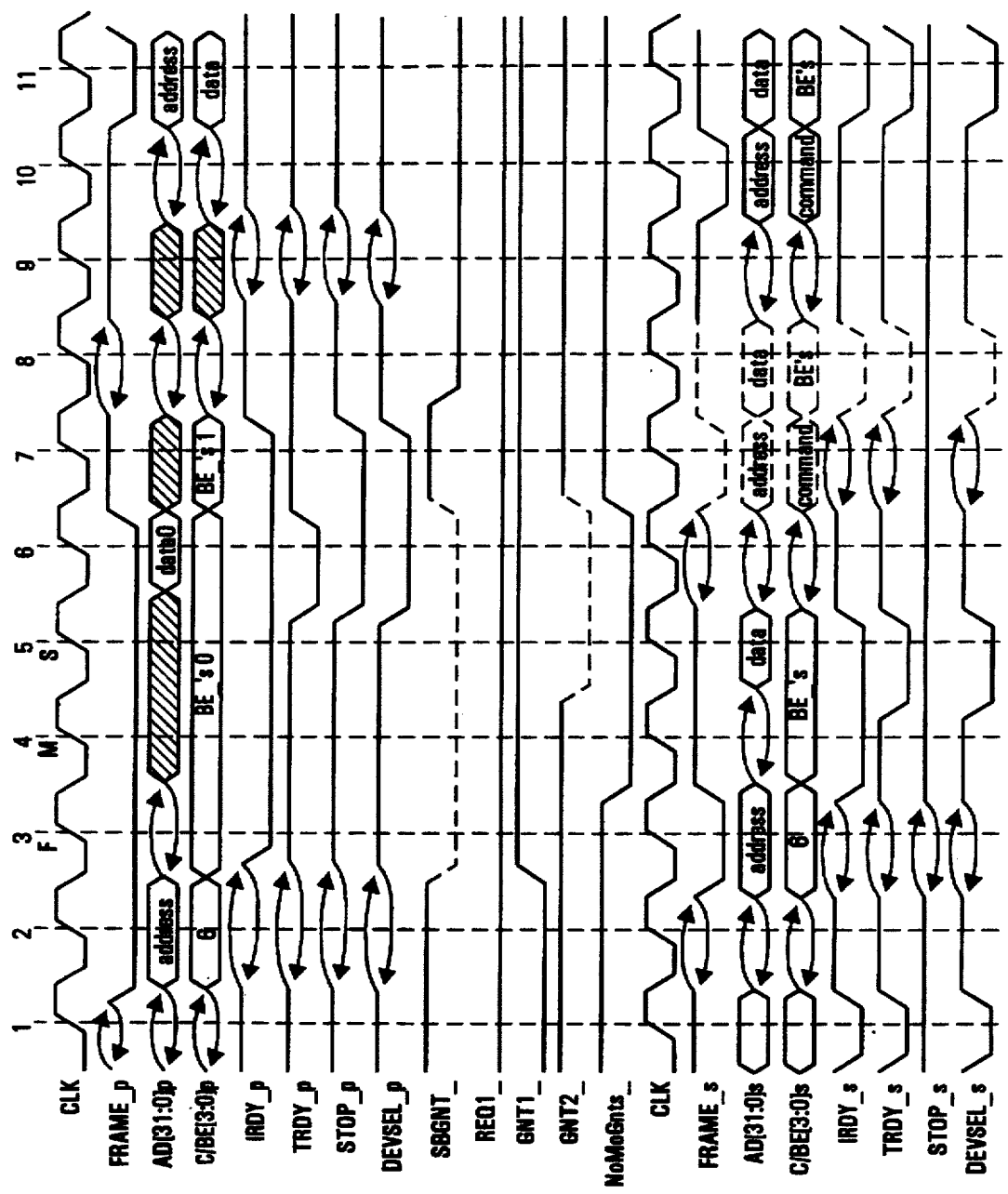
FIG. 6 is a timing diagram illustrating a downstream burst read sequence.

Now referring to FIG. 6, there is illustrated an attempted burst read transaction of the prior art between a master on a primary PCI bus, such as PCI bus 112 and a target on a secondary PCI bus, such as secondary PCI bus 118 using the memory read command. The dotted lines illustrate an undesirable condition, which the present invention solves.

If a master on the primary PCI bus 112 attempts to read more than one DWORD across the PCI repeater 116 (or prior art repeater), the PCI repeater 116 will terminate the transaction after a single data phase (clock 7) because the PCI repeater does not have the next set of byte enables from the requesting master. The master must subsequently perform another transaction to read the remaining data. Hence, the transaction is broken into multiple single data transfers.

FIG. 6 also shows a secondary bus grant (SBGNT_ signal. This signal is provided by an arbiter, such as arbiter 111, to enable a secondary bus arbiter, such as secondary bus arbiter 206. Normally, the SBGNT_signal is asserted on clock 2 to allow the secondary arbiter to issue grants, such as GNT2_. Thus, once the secondary PCI bus 118 has completed the transaction (clock 5), the secondary bus device asserting the request corresponding to GNT2_will own the secondary PCI bus (clock 6).

Because of the inherent latencies of the PCI repeater 116 (and prior art repeater), a transaction on the secondary PCI bus 118 could begin (clock 6) before the primary PCI bus 112 is ready to receive the echoed transaction, as shown by the transaction in dotted lines starting on the secondary PCI bus in clock 6.

To prevent this problem from occurring, the PCI repeater 116 of the present invention asserts the NoMoGnts_signal (clock 3) as soon as the PCI repeater 116 detects a memory read command and FRAME_p is held asserted indicating that the master on the primary PCI bus 112 wants to burst the read transaction. The NoMoGnts_signal is held asserted until the PCI repeater 116 signals a disconnect to the master on the primary PCI bus 112 (TRDY_p and STOP_p asserted in clock 6). This prevents the arbiters 111 and 206 from asserting grants signals until the transaction is completed on both buses. If the repeater 116 detects that the master and the target are on the same bus (i.e. primary PCI bus 112), it instead immediately deasserts the NoMoGnts_ signal after DEVSEL_p is asserted (not shown) to allow the arbiter 111 to pipeline the grants as normal. Thus, the PCI repeater 116 handles read transactions to non-prefetchable regions where the read transaction is broken into multiple single data transfers.

Figure 7:
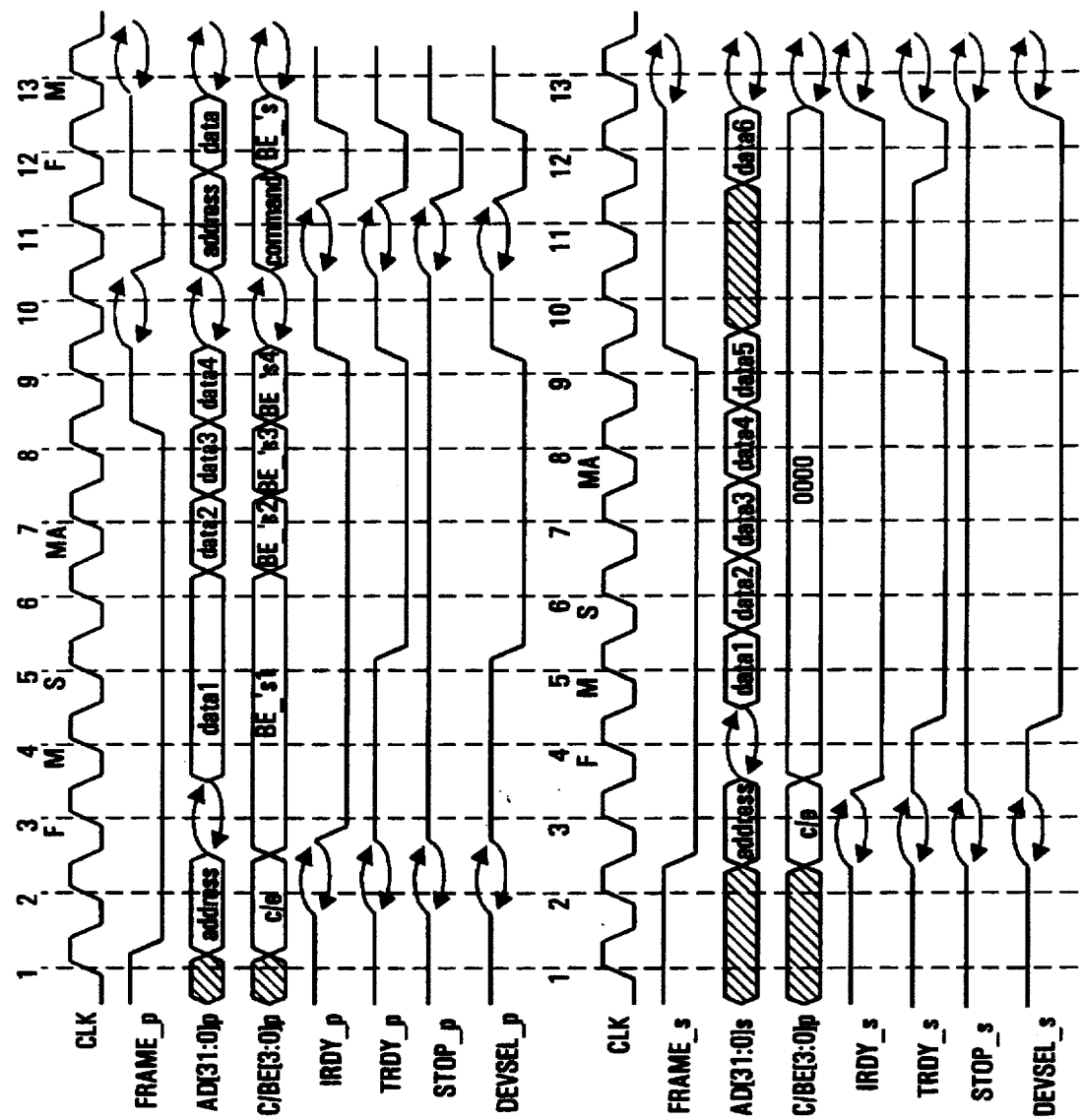
FIG. 7 is a timing diagram illustrating a downstream burst read sequence without arbiter intervention.

Referring now to FIG. 7, there is illustrated another problem of the prior art PCI repeater with regard to memory read line and memory read multiple PCI commands. The memory read line and memory read multiple commands are used to access data in address ranges that are prefetchable. FIG. 7 illustrates a case where a master on the primary PCI bus initiates a memory read line or a memory read multiple command. The prior art PCI repeater would start the cycle on the secondary side and continue requesting new data until it samples FRAME_p deasserted. A problem develops if the target adds waits states to the transfer and therefore keeps the secondary PCI bus busy while the primary PCI bus is free to begin another cycle that targets a slave on the primary PCI bus (clock 10). In this case, the prior art PCI repeater would miss an entire transaction since the transaction on the secondary bus does not end until clock 12.

Figure 8:
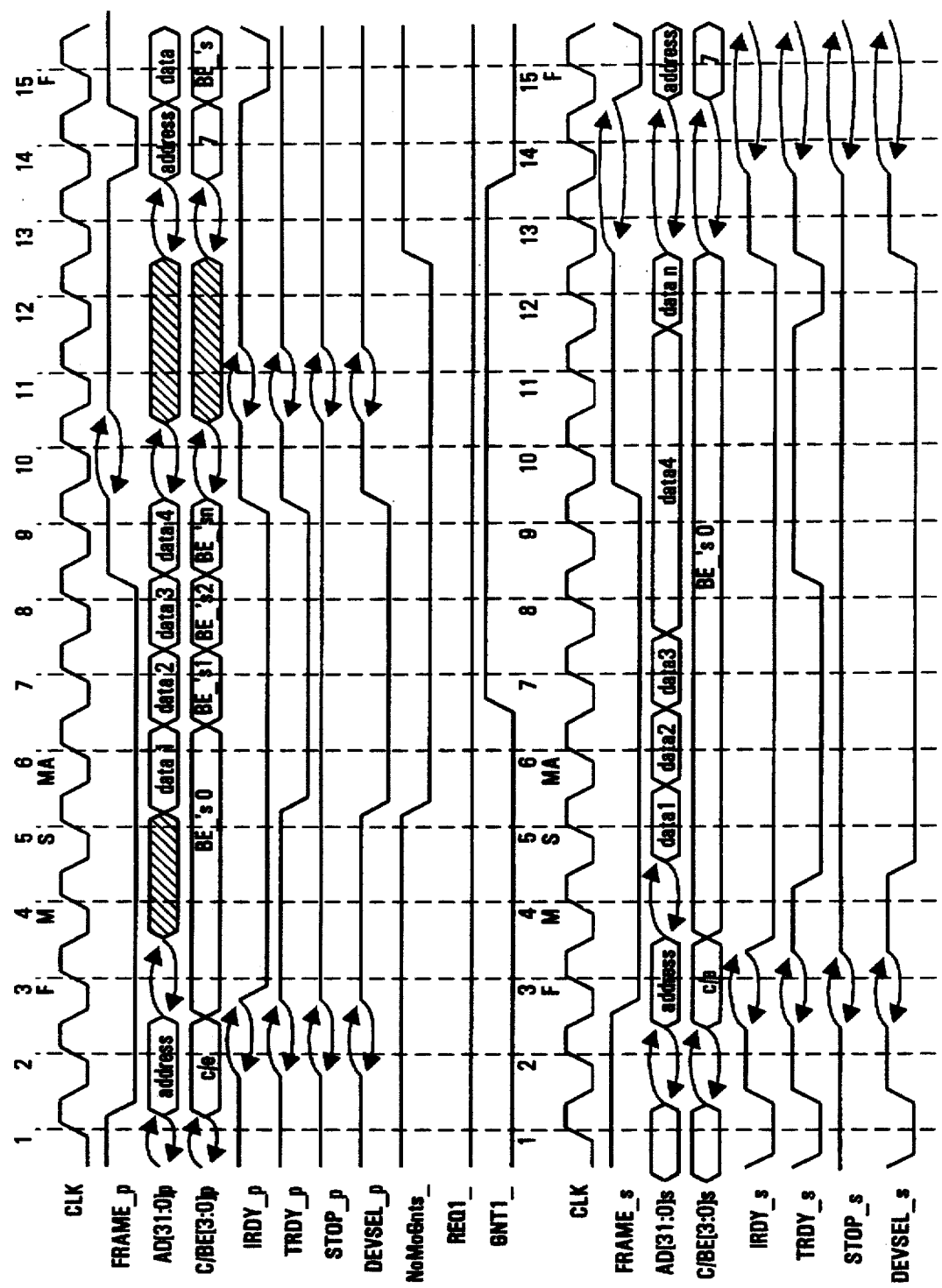
FIG. 8 is a timing diagram illustrating a downstream burst read sequence with arbiter intervention.

Now referring to FIG. 8, there is illustrated a downstream burst read sequence with arbiter intervention according to the preferred embodiment, solving the problem of FIGS. 6–7. A master initiates a memory read line or memory read multiple command on the primary PCI bus 112 to a target on the secondary PCI bus 118. The PCI repeater 116 initiates the command on the secondary PCI bus 118 on clock 2. The PCI repeater 116 sets the byte enables to all zeros regardless of the requesting master byte enables to read all the bytes and to be able to read ahead (or prefetch) of the master on the primary bus 112 (since byte enables are not pipelined). On clock 5, because the transaction is not positively claimed on the primary PCI bus 112, the PCI repeater 116 determines that the transaction is heading downstream and asserts the NoMoGnts_signal to notify the PCI arbiter 111 to remove the current grant (GNT1_) on the primary PCI bus 112 and any subsequent grants until the secondary PCI bus 118 finishes its current transaction. The NoMoGnts_signal is deasserted on clock 12 when the read completes on the secondary PCI bus 118.

The read prefetching is terminated on the secondary PCI bus 118 as soon as the PCI repeater 116 detects the last data phase on the primary PCI bus 112. The last data phase is signaled by the deassertion of FRAME_p on clock 8 and of IRDY_p on clock 9. On clock 9 the PCI repeater 116 signals its last data phase is completed on the secondary PCI bus 118 when the FRAME_s signal is deasserted on clock 9. Thus, the master on the primary PCI bus 112 finishes reading while the PCI repeater 116 is still reading the next DWORD from the target on the secondary PCI bus 118. So as not to violate PCI protocol, the PCI repeater holds the C/BE[3:0]s and IRDY_s signals on the secondary PCI bus 118 until the last data phase can be completed on the secondary PCI bus 118 at clock 12. After the PCI repeater 116 detects the last data phase, the repeater 116 drives the AD[31:0]p, and C/BE [3:0]p buses to a valid state (from clock 11 until clock 12), when the secondary PCI bus 118 read transaction is ended. Therefore, the PCI repeater 116 attempts to stay ahead of the requesting master by requesting more data. Unused data is discarded by the PCI repeater 116.

Upstream Transactions

Upstream transactions are transactions initiating on the secondary PCI bus 118 and targeting a device on the primary PCI bus 112. The PCI repeater handles upstream transactions the same way it handles downstream transactions, but with a few exceptions. The PCI repeater 116 will not respond to upstream configuration cycles.

One problem facing the PCI repeater 116 is how to determine which cycles are headed upstream and which are headed downstream. Two alternative solutions are possible. In a first alternative, the subtractive decode logic of the PCI to ISA bridge is enabled during downstream transactions only. The PCI repeater 116 broadcasts every transaction originated on the secondary PCI bus 118 to the primary PCI bus 112. If the transaction is not positively claimed by a device on the secondary PCI bus 118, it is subtractively claimed by the repeater 116. Thus, the transaction is sent upstream. However, peer to peer transactions between devices on the secondary PCI bus 118 and devices on the ISA bus 128 are not available. In a second alternative, the PCI repeater 116 halts operation on the secondary PCI bus 118 and echoes the transaction to the primary PCI bus 112. If the target is on the primary PCI bus 112, the target positively claims the transaction. If the transaction is not positively claimed by a primary bus PCI agent, the PCI repeater 116 subtractively claims the transaction and runs it on the secondary PCI bus 118. If the target is an ISA device, the PCI to ISA bridge 122 subtractively claims the transaction from the secondary PCI bus. This preferred alternative has the advantage of handling a hierarchy of buses.

Figure 9:
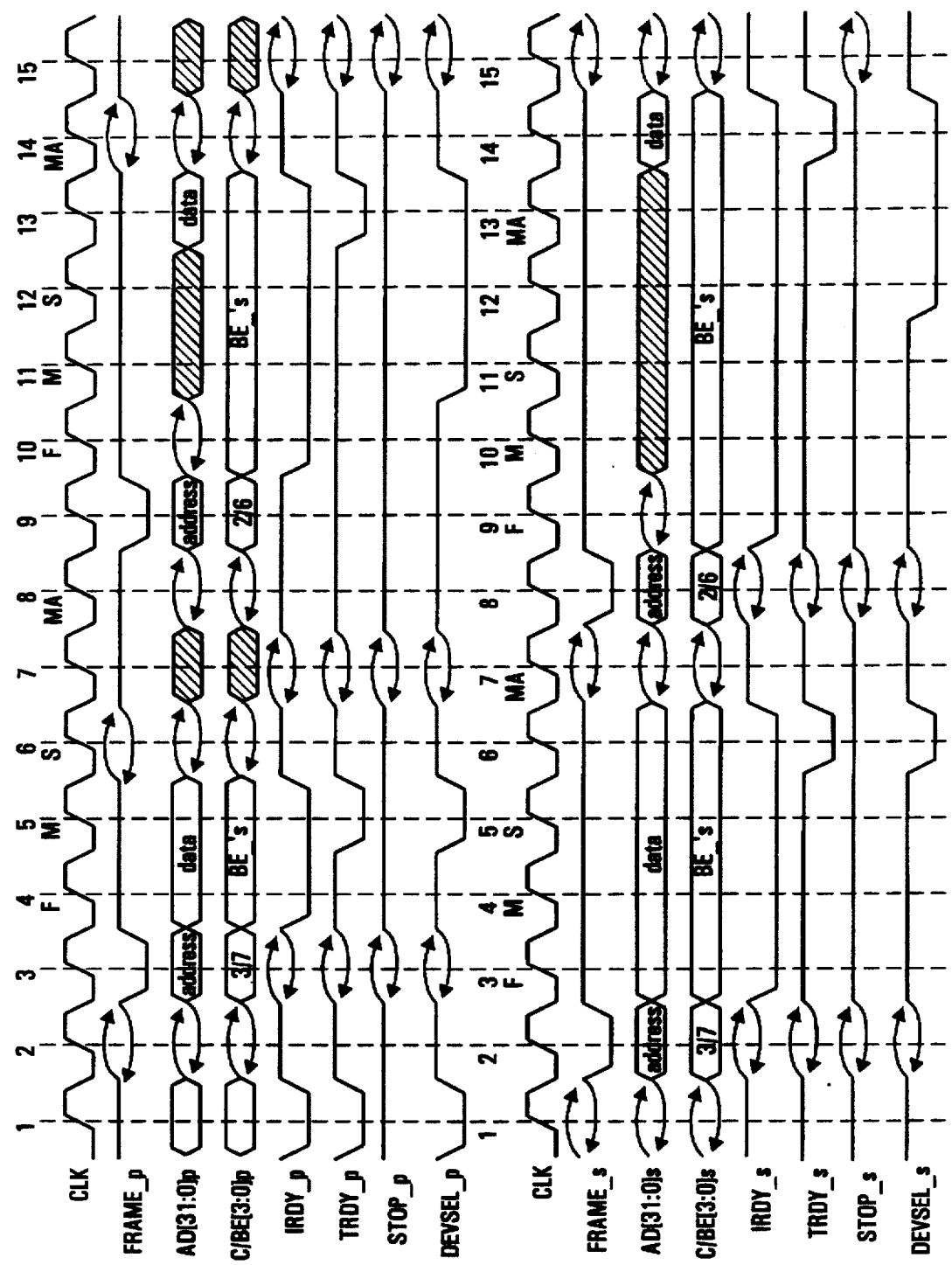
FIG. 9 is a timing diagram illustrating an upstream single data phase write transaction followed by an upstream single data phase read transaction.

FIGS. 9–12 correspond to the first alternative. The principles illustrated in the Figures and described below apply equally to memory or I/O transactions. Referring now to FIG. 9, there is illustrated two single DWORD transactions initiated on the secondary PCI bus 118 and terminated on the primary PCI bus 112. The first transaction is a write transaction positively claimed by a device on the primary PCI bus 112 using medium decode timing and the second transaction is a read transaction claimed using medium decode timing. The first upstream transaction starts on clock 1 on the secondary PCI bus 118. The transaction is echoed upstream to the primary PCI bus 112 on clock 2. The PCI repeater 116 senses FRAME_s deasserted on clock 3, determines that this is a single data phase transaction, and asserts IRDY_p to allow the write transaction to complete. The transaction is positively decoded on the primary PCI bus 112 on clock 4 using medium decode timing. As soon as the repeater 116 samples DEVSEL_p asserted on clock 5, it copies the state of the DEVSEL_p on to DEVSEL_s along with the remaining slave signals (TRDY_p and STOP_p)).

The upstream read transaction follows in a similar manner. The transaction starts on the secondary PCI bus 118 on clock 7 and is echoed to the primary PCI bus 112 on clock 8. The transaction is accepted on the primary PCI bus 112 on clock 10 and DEVSEL_s is echoed to the secondary PCI bus 118 on clock 11. On clock 12, the target places the requested data on the primary PCI bus 112 and asserts TRDY_p to terminate the transaction. On clock 13, AD[31:0]p and TRDY_p are echoed to the secondary PCI bus 118.

Figure 10:
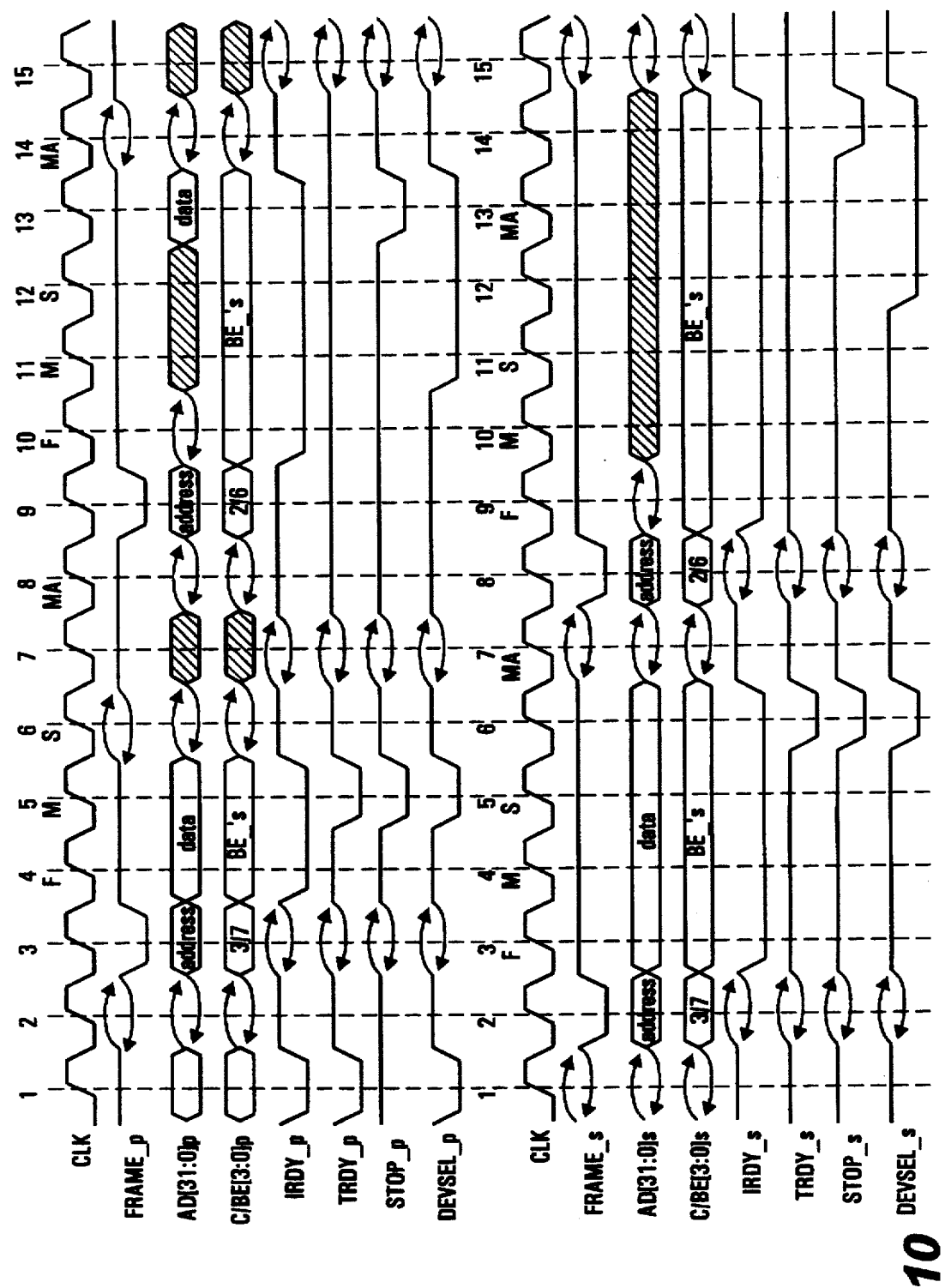
FIG. 10 is an upstream target disconnect write transaction followed by an upstream read retry transaction.

Now referring to FIG. 10, there is illustrated a target disconnect write transaction followed by a target retry read transaction. Because the PCI repeater 116 does not post single data phase transactions, the PCI repeater 116 handles upstream target disconnect and retries the same way it handles the downstream transactions. On clock 4, a target on the primary PCI bus 112 signals a disconnect which in turn is echoed to the initiator on the secondary PCI bus 118 by the PCI repeater 116 on clock 5. In a similar fashion, a retry is signaled by a target on the primary PCI bus 112 on clock 12, which in turn is echoed to an initiator on the secondary PCI bus 118 by the PCI repeater 116 on clock 13.

Figure 11:
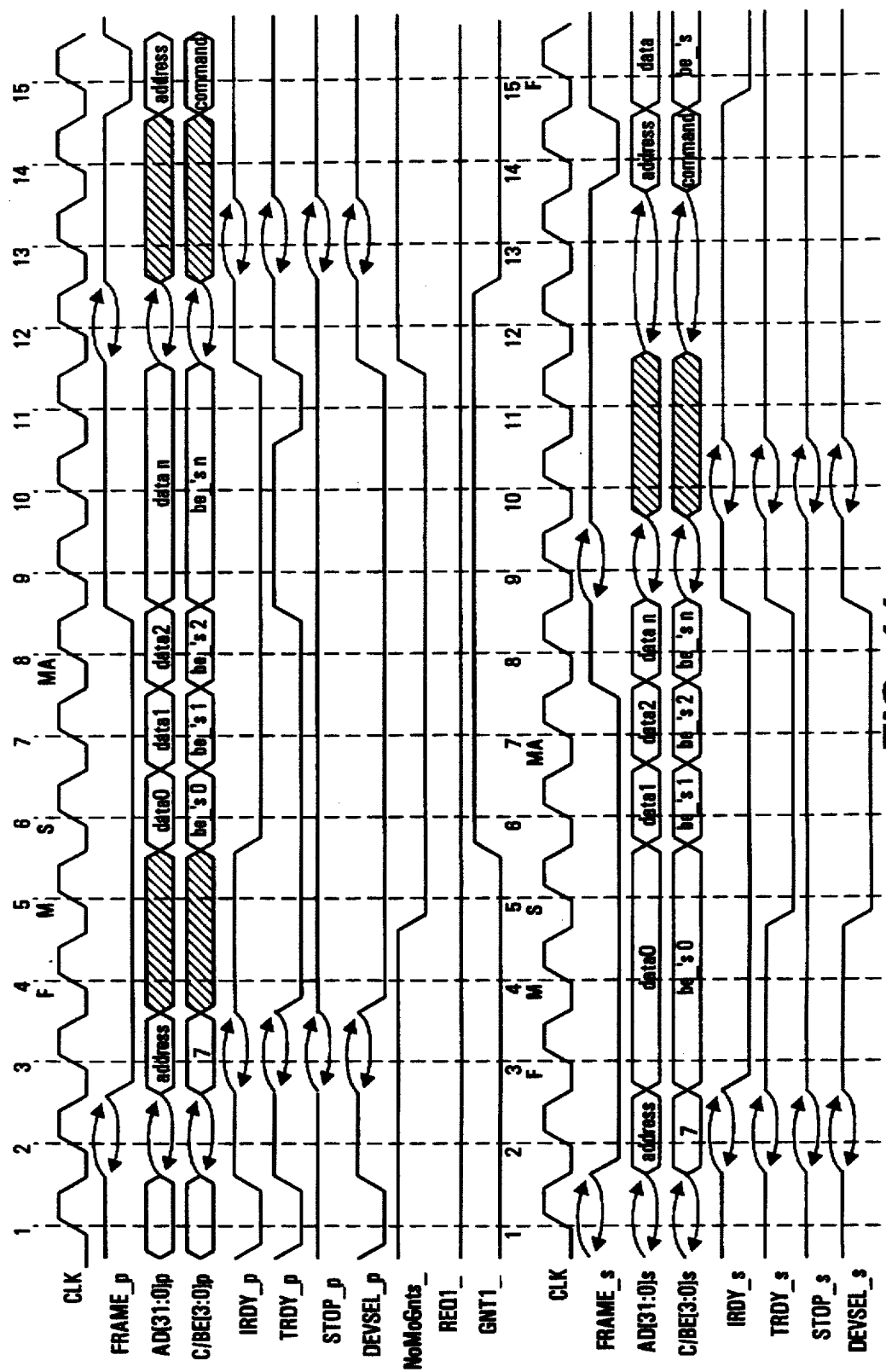
FIG. 11 is a timing diagram illustrating an upstream burst write sequence.
Figure 12:
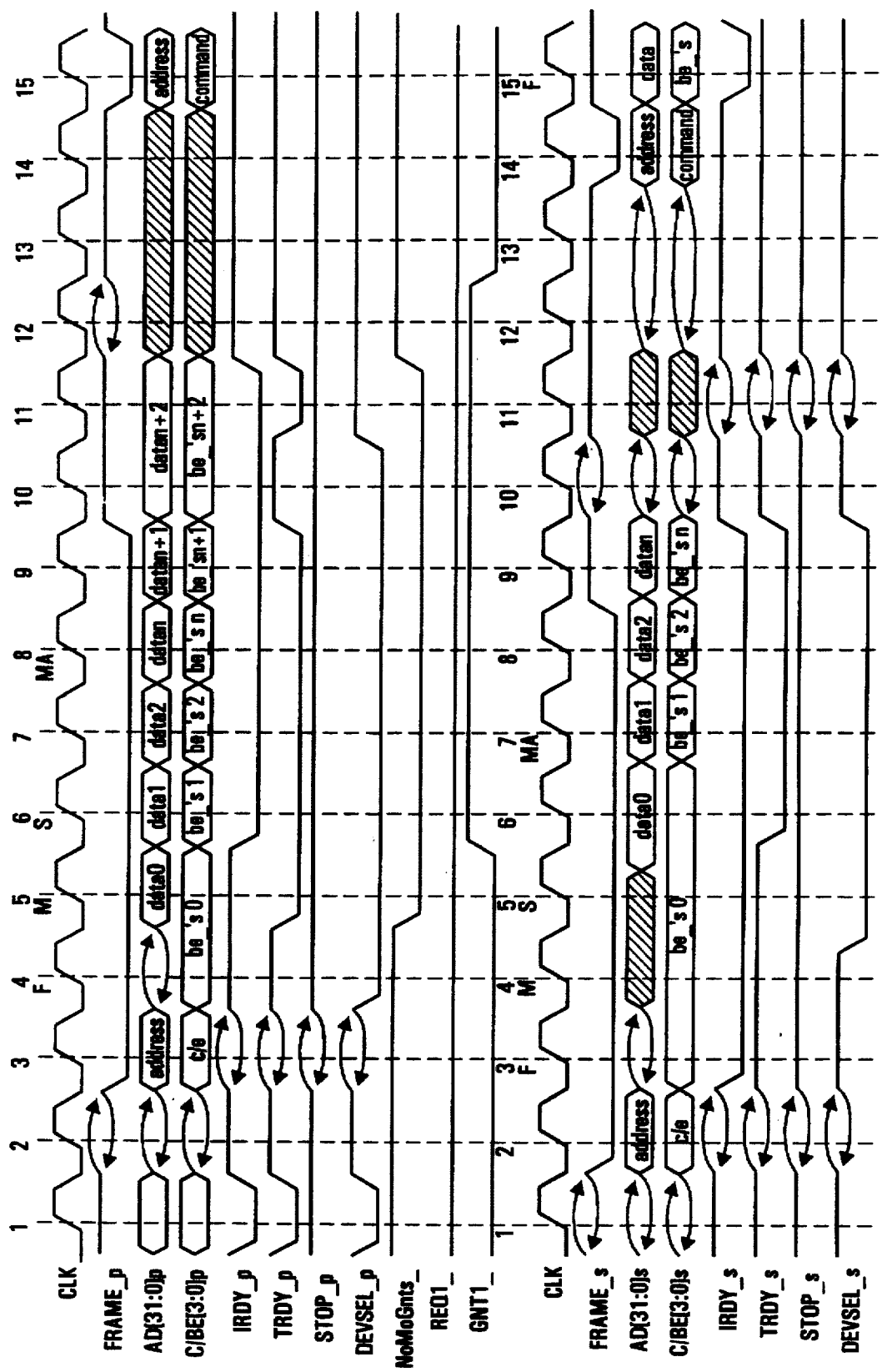
FIG. 12 is a timing diagram illustrating an upstream burst read sequence.

Now referring to FIGS. 11 and 12, there are illustrated an upstream burst write sequence and upstream read sequence respectively. Upstream burst transactions are similar to downstream burst transactions in that the arbiter 111 must not grant the PCI bus 112 and 118 to any agent until after the current transaction completes. This is accomplished by asserting the NoMoGnts_signal as soon as the PCI repeater 116 determines that the transaction originated on the secondary PCI bus 118 is accepted by a target on the primary PCI bus 112. The target on the primary PCI bus 112 indicates its acceptance of the transaction by asserting DEVSEL_p, as shown at clock 3 with fast decode timing. The NoMoGnts_signal remains asserted until the transaction completes on the primary PCI bus 112, as shown from clocks 4–11. In these examples, it can be seen that the NoMoGnts_signal remains asserted even while the target on the primary PCI bus 112 inserts wait states (clocks 8–9 in FIG. 11 and clock 9 in FIG. 12) before accepting the final write cycle.

Figure 13:
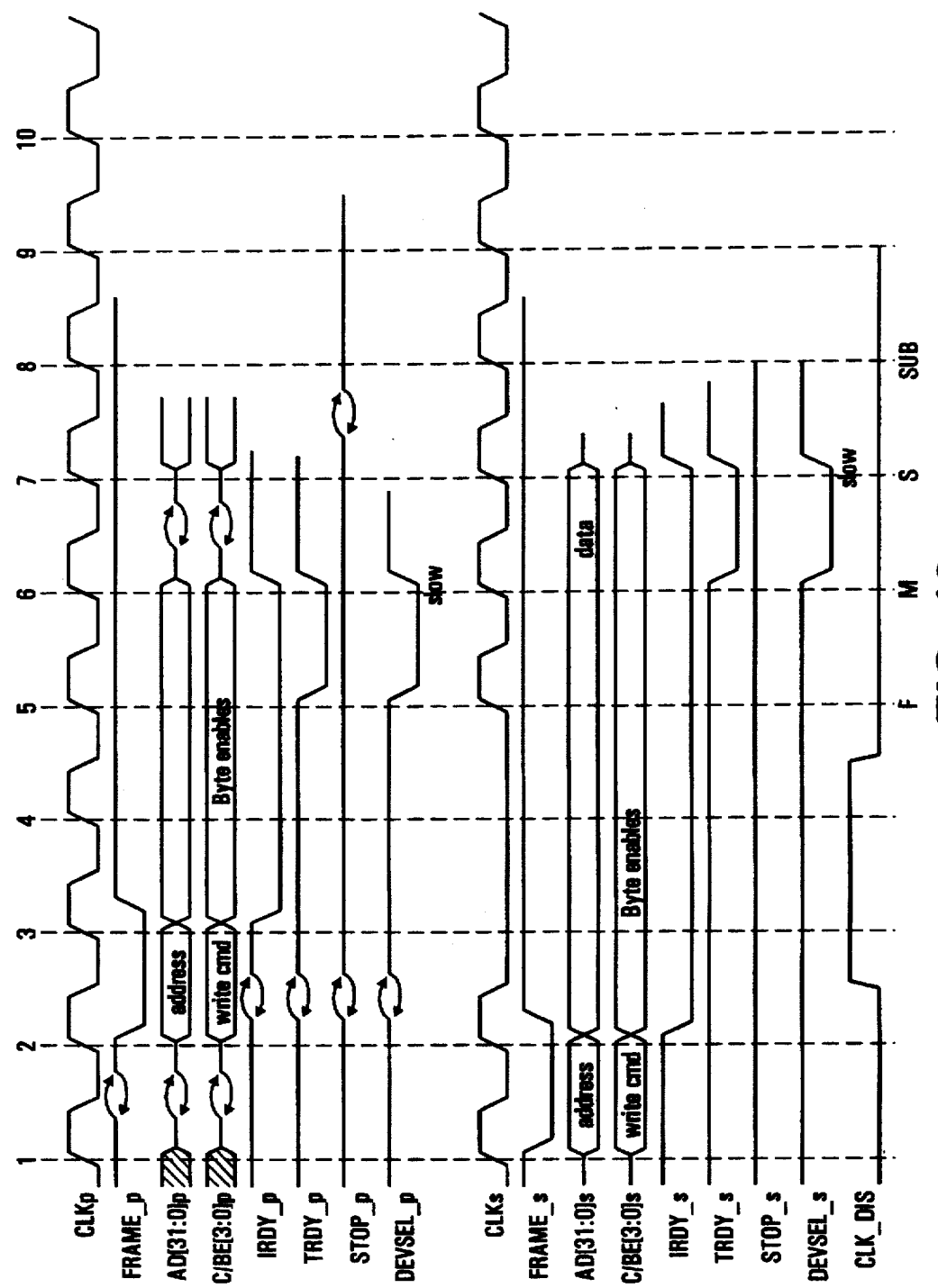
FIG. 13 is a timing diagram illustrating an upstream single phase write transaction positively claimed on the primary bus.
Figure 14:
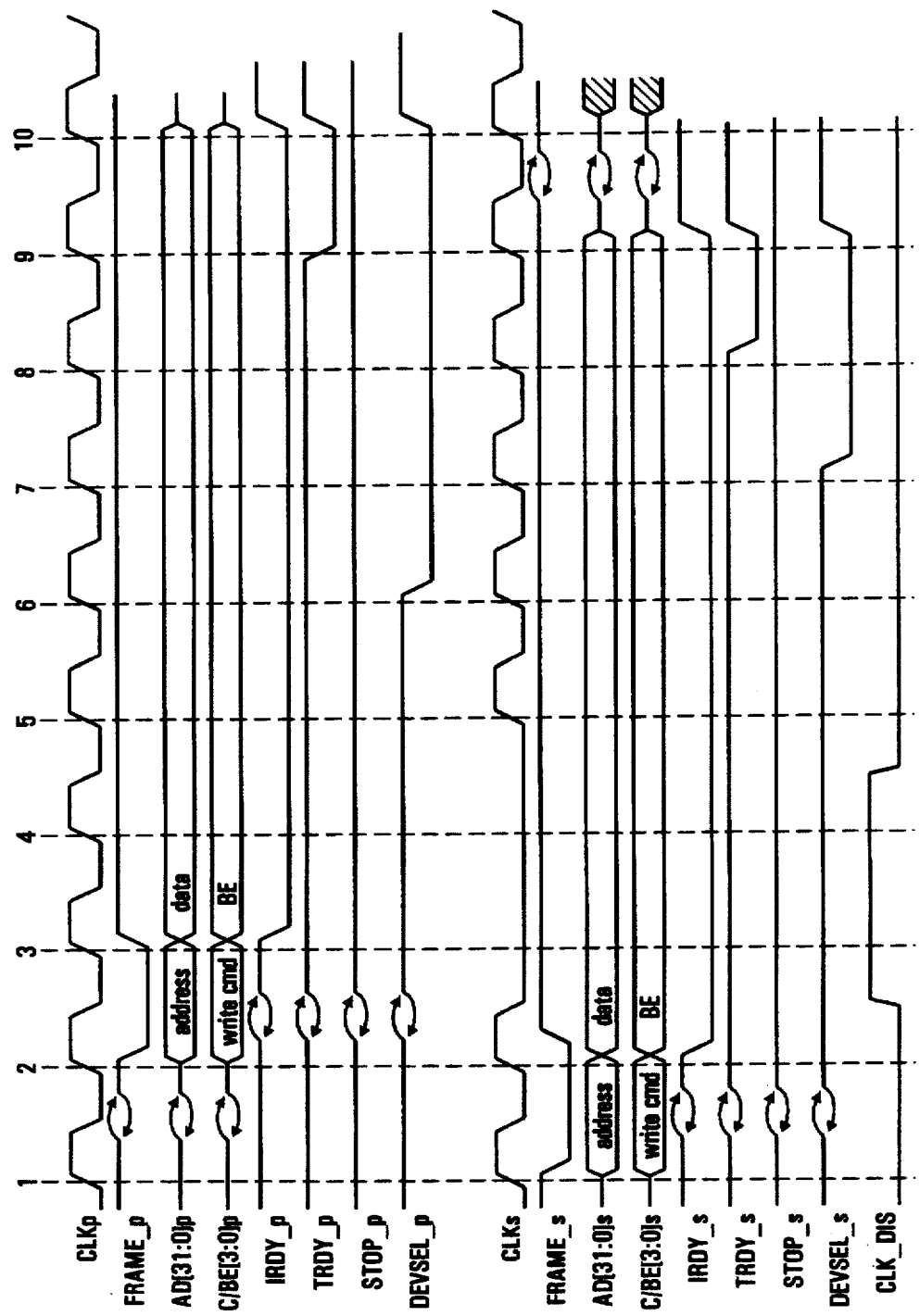
FIG. 14 is a timing diagram illustrating an upstream single data phase write transaction echoed on the primary bus and subtractively claimed by the secondary bus.
Figure 15:
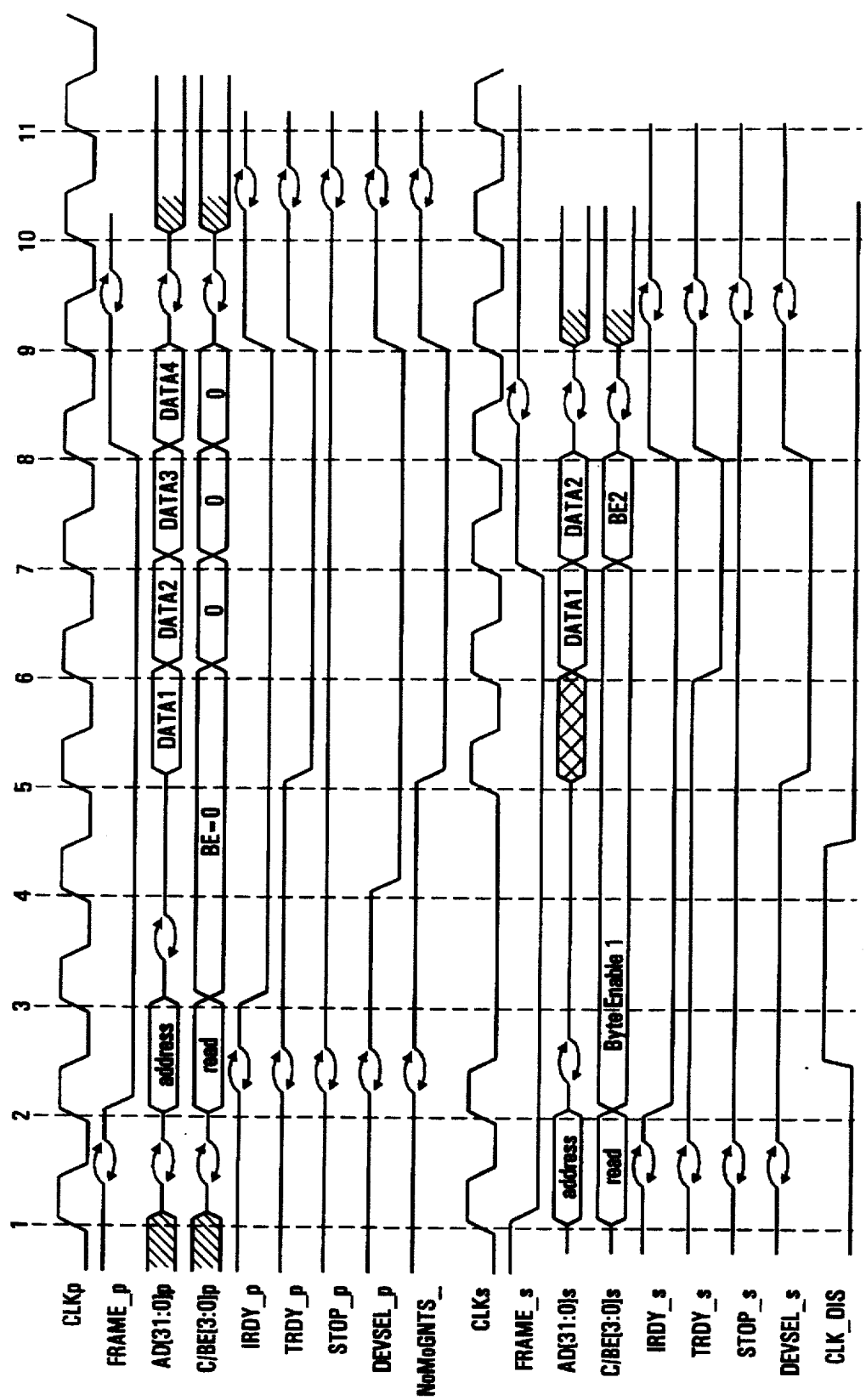
FIG. 15 is a timing diagram illustrating an upstream burst read sequence claimed on the primary bus.

FIGS. 13–15 correspond to the second alternative. FIG. 13 illustrates an upstream single data phase write transaction positively claimed on the primary PCI bus 112. FIG. 14 illustrates a upstream single data phase write transaction not positively claimed on the primary PCI bus 112 or the secondary PCI bus 118, but subtractively claimed on the ISA bus 128. The principles illustrated in these Figures apply equally to memory and I/O transactions. In FIG. 13, the transaction starts on the secondary PCI bus 118 on clock 1 and is echoed to the primary PCI bus 112 on clock 2.

In order to allow a prospective primary bus target sufficient time to respond, the secondary PCI bus 118 clock (CLKs) is halted for two PCI clock cycles by a clock disable (CLK_DIS) signal at the end of clock 2. The two clock delay allows the transaction to be claimed by either a primary PCI bus 112 target or secondary PCI bus 118 target before the ISA to PCI bridge 122 would subtractively claim the transaction. A primary bus agent could claim the transaction by asserting DEVSEL_p on clocks 3, 4 or 5. A secondary bus agent could claim the transaction by asserting DEVSEL_s on clocks 2, 5 or 6. At the end of clock 4, the CLKs is started again.

In FIG. 13, a primary bus target claims the transaction with slow decode timing by asserting DEVSEL_p on clock 5. On clock 6, the PCI repeater senses the assertion of DEVSEL_p and echoes DEVSEL_p and TRDY_p onto the secondary PCI bus 118 and the transaction is terminated on the secondary bus 118—that is, it will not be subtractively decoded by the ISA to PCI bridge 122.

Now turning to FIG. 14, the transaction starts on the secondary PCI bus 118 on clock 1 and is echoed to the primary PCI bus 112 on clock 2 to allow the conventional decode logic of the primary bus unit 200 to determine if the address range corresponds to a target on the primary PCI bus 112. The secondary PCI bus clock (CLKs) is halted again for two clocks as in FIG. 13. However, this time the transaction is not claimed on the primary PCI bus 112. On clock 6, the PCI repeater 116 senses the negated state of DEVSEL_p, determines that the target is not on the primary PCI bus 112 and asserts DEVSEL_p to subtractively claim the transaction from the primary bus 112. On the secondary PCI bus 118, the transaction has also been unclaimed. On clock 7, the PCI repeater 116 senses that DEVSEL_s is still unasserted and the assertion of DEVSEL_p with subtractive decode timing and therefore determines that the target is on the ISA bus 128. On clock 7, the ISA to PCI bridge senses that DEVSEL_s is still unasserted and asserts DEVSEL_s to subtractively claim the transaction. The transaction completes as normal on clock 9. Thus, the target of a transaction is transparently determined without requiring any special upstream address decoding logic to be contained in the PCI repeater 116.

Now referring to FIG. 15, there is illustrated an upstream prefetchable burst read sequence. In this second alternative, upstream burst transactions are similar to downstream burst transactions in that the arbiter 111 must not grant the PCI bus 112 and 118 to any agent until after the current transaction completes. The transaction starts on the secondary PCI bus on clock 1 and is echoed to the primary PCI bus 112 on clock 2 to determine if the target is on the primary bus. The byte enables C/BE[3:0]p are forced to zero so that prefetching may occur. IRDY_s is asserted by the initiator on the secondary bus 118 on clock 2 and is echoed to the primary PCI bus 112 on clock 3.

While prospective targets on the primary PCI bus 112 are decoding the transaction, the PCI clock of the secondary PCI bus (CLKs) is halted by the PCI repeater 116 for two clocks. At clock 5, the secondary PCI bus clock is started again. A target on the primary PCI bus 112 accepts the transaction by asserting DEVSEL_p on clock 4 and the PCI repeater 116 echoes the signal (DEVSEL_s) onto the secondary bus on clock 5. Thus, the subtractive decode agent of the secondary PCI bus 118 assumes the transaction was positively claimed on the secondary bus 118.

On clock 5, the PCI repeater 116 senses FRAME_p and DEVSEL_p asserted and asserts NoMoGnts_in response to preclude the arbiter 111 from granting the PCI bus to a secondary bus initiator until the current sequence has completed on the primary PCI bus 112. On clock 9, the PCI repeater 116 senses the completion of the burst read sequence and in response deasserts the NoMoGnts_signal.

If the burst sequence had not been claimed by a target on the primary PCI bus 112, the sequence would have been claimed by a target on the secondary PCI bus 118. By first sending the transaction upstream for decoding on the primary bus before running the transaction on the secondary bus, the PCI repeater 116 can use the inherent address decoding logic of the PCI devices. Thus, the PCI repeater 116 does not need any special downstream or upstream decode logic to handle these transactions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of transparently decoding a transaction in a computer system, the computer system including a first bus coupled to a second bus by a first subtractive decode agent, the first bus having devices coupled thereto, the second bus having a second subtractive decode agent and devices coupled thereto, one of the devices being an initiator, the method comprising the steps of:

(a) said initiator starting a transaction on the second bus to a target device;

(b) echoing the transaction on the first bus;

(c) halting operation of the second bus while devices on the first bus decode the transaction and before the second subtractive decode agent subtractively claims the transaction; and (d) continuing the transaction on said second bus.

2. The method of claim 1, wherein one of the first bus devices is the target device, the method further comprising the steps of:

(e) the first bus device providing an indication to positively claim the transaction; and (f) echoing the indication on the second bus before the second subtractive decode agent subtractively claims the transaction.

3. The method of claim 1, wherein one of the second bus devices is the target device, the method further comprising the steps of:

(g) the second bus device providing an indication to positively claim the transaction.

4. The method of claim 1, wherein the second subtractive decode agent is coupled between the second bus and a third bus, the third bus having devices coupled thereto, wherein one of the third bus devices is the target device, the method further comprising the step of:

(h) the second subtractive decode agent subtractively claiming the transaction for the third bus if the transaction was not positively claimed by devices on the first and second buses.

5. The method of claim 4, wherein said third bus is an ISA bus.

6. The method of claim 4, wherein said second bus is downstream from said first bus and said third bus is downstream from said second bus.

7. The method of claim 1, wherein the second bus is governed by a clock and wherein said halting step is performed by stopping the clock.

8. The method of claim 7, wherein the clock is stopped for 2 clocks.

9. A repeater for coupling a first bus to a second bus, the first and second buses having devices coupled thereto, the second bus having an initiator coupled thereto, the repeater being a subtractive decode agent on the first bus, the repeater comprising:

a first bus unit for echoing signals from the first bus to the second bus; and a second bus unit for echoing signals from the second bus to the first bus, wherein when the initiator starts a transaction on the second bus, the second bus unit echoes the transaction to the first bus and temporarily halts operation on the second bus while devices on the first bus decode the transaction, and wherein if the transaction is not positively claimed by a device on the first bus the first bus unit subtractively claims the transaction for the second bus.

10. The repeater of claim 9, wherein if the transaction is positively claimed by a first bus device, the first bus unit echoes signals from the first bus to the second bus.

11. The repeater of claim 9, wherein said second bus has devices coupled thereto and wherein if the transaction is positively claimed by a second bus device, said first bus signals are no longer echoed to said second bus.

12. The repeater of claim 9, wherein said second bus has a second subtractive decoder coupled thereto and wherein if the transaction is not positively claimed by a device on the second bus the second subtractive decoder subtractively claims the transaction and said first bus signals are no longer echoed to said second bus.

13. The repeater of claim 12, wherein said first and second buses are a PCI bus and said second subtractive decoder is coupled between the second bus and an ISA bus.

14. The repeater of claim 12, wherein said second bus is downstream from said first bus and a third bus is downstream from said second bus.

15. The repeater of claim 9, wherein the second bus is governed by a clock and wherein the second bus unit halts operation by stopping the clock.

16. The repeater of claim 15, wherein the clock is stopped for 2 clocks.

17. A computer system, comprising:

a first bus;

a processor coupled to said first bus;

memory coupled to said first bus;

one or more devices coupled to said first bus, one of the devices being a hard disk system;

a second bus;

one or more devices coupled to said second bus, one of the devices being an initiator and another of the devices being a first subtractive decode agent coupled between said first bus and said second bus, the first subtractive decode agent comprising:

a first bus unit for echoing signals from the first bus to the second bus; and a second bus unit for echoing signals from the second bus to the first bus, wherein when the initiator starts a transaction on the second bus, the second bus unit echoes the transaction to the first bus and temporarily halts operation on the second bus while devices on the first bus decode the transaction, and wherein if the transaction is not positively claimed by a device on the first bus the first bus unit subtractively claims the transaction for the second bus.

18. The computer system of claim 17, wherein if the transaction is positively claimed by a first bus device, the first bus unit echoes signals from the first bus to the second bus.

19. The computer system of claim 17, wherein said second bus has devices coupled thereto and wherein if the transaction is positively claimed by a second bus device, said first bus signals are no longer echoed to said second bus.

20. The computer system of claim 17, wherein said second bus has a second subtractive decoder coupled thereto and wherein if the transaction is not positively claimed by a device on the second bus the second subtractive decoder subtractively claims the transaction and said first bus signals are no longer echoed to said second bus.

21. The computer system of claim 20, wherein said first and second buses are a PCI bus and said second subtractive decoder is coupled between the second bus and an ISA bus.

22. The computer system of claim 20, wherein said second bus is downstream from said first bus and a third bus is downstream from said second bus.

23. The computer system of claim 17, wherein the second bus is governed by a clock and wherein the second bus unit halts operation by stopping the clock.

24. The computer system of claim 23, wherein the clock is stopped for 2 clocks.

* * * * *